Aug. 21, 1928.

J. P. McDONNELL 1,681,776

APPARATUS FOR PRODUCING OPTICAL EFFECTS FROM PICTURES

Filed Feb. 18, 1925

INVENTOR.
JAMES P. McDONNELL
BY HIS ATTORNEYS

Williamson Reyf Williamson

Patented Aug. 21, 1928.

1,681,776

UNITED STATES PATENT OFFICE.

JAMES P. McDONNELL, OF WAVERLY, MINNESOTA.

APPARATUS FOR PRODUCING OPTICAL EFFECTS FROM PICTURES.

Application filed February 18, 1925. Serial No. 9,948.

This invention relates to apparatus and a method for producing optical effects from still pictures capable of wide general application and producing a great variety of optical effects.

An object of the invention is to provide an extremely simple but highly efficient apparatus for producing apparent action from still pictures by the application of a revolubly mounted transparent member in combination with a specially prepared picture to be viewed therethrough.

It is a further object of the invention to provide apparatus for alternately dimming and intensifying characters or figures in pictures.

More specifically it is an object of the invention to provide in such apparatus a picture having figures represented therein of different colors and a transparent plate or disk mounted for movement or revolution over said picture, through which said picture may be viewed and having sections therein of respectively different colors.

The invention is especially adapted for use in comic newspaper supplements, pictures or newspaper cut-outs, but is, of course, equally applicable for advertising purposes, theatrical or other uses.

These and other objects of the invention will be apparent from the following description made in connection with the accompanying drawings wherein like characters refer to similar parts throughout the several views, and in which, Fig. 1 is a perspective view of the apparatus about to be put in operation;

Figure 2:
Fig. 2 represents one of the specially prepared pictures constituting a part of said apparatus.

In the picture illustrated in Fig. 2, several colors are employed. The portion of the picture shown in the fine dotted lines, namely, the upper portion of the man, and axe, illustrated by the numeral 7, is colored in red in one position, and the second position of the same portions, shown in the heavy dot and dash lines as 8, is colored preferably blue, while likewise the word "Zip" is colored in blue and the word "Bang" colored in red. The other figures and objects in the picture may be colored in any bright contrasting color other than red or blue.

Figure 1:
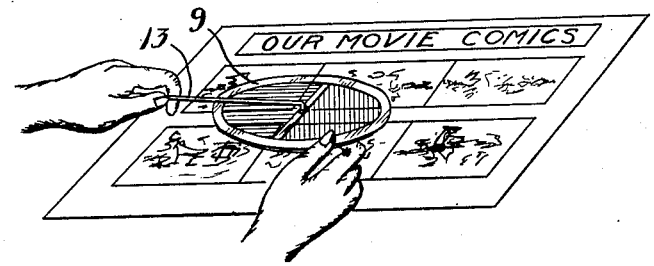

The part of the apparatus, constituting the revoluble transparent member, comprises a pair of divided annular frame members 9 having the dividing transverse portion 9ª. The transparent sections 10 and 11 are interposed between the two annular frame members 9, section 10 preferably being colored red and section 11 colored blue to correspond with the colors employed in the portions of the figures designated by the numerals 7 and 8. Frame members 9 are shown as secured together by means of a plurality of small rivets 12 with, of course, sections 10 and 11 clamped therebetween. An aperture is provided in the center of the disk through the transverse members 9ª in order to accommodate the small bearing or hub 14 clinched against the outer sides of members 9ª. The handle member 13, having an enlarged head 13ª, is passed through the apertured bearing 14, thus permitting the disk to be revolved thereon and supported by the head 13ª. An ordinary nail can be used in place of the handle member 13, if desired. Obviously, the outer end of member 13 is adapted to be grasped with one hand and the plate or disk held over a picture desired to be viewed and revolved with the other hand, as illustrated in Fig. 1. While the colors red and blue are preferably used in illustrating the moved positions of the figures on the picture and in the transparent sections of the revoluble member, other colors may, of course, be substituted therefor with successful results. Also, it is to be understood that, where in the specification and claims, the words "a plurality of colors" or "several colors" are used, the expressions are meant to include a section in some bright color and another section entirely transparent and untinted.

Figure 3:
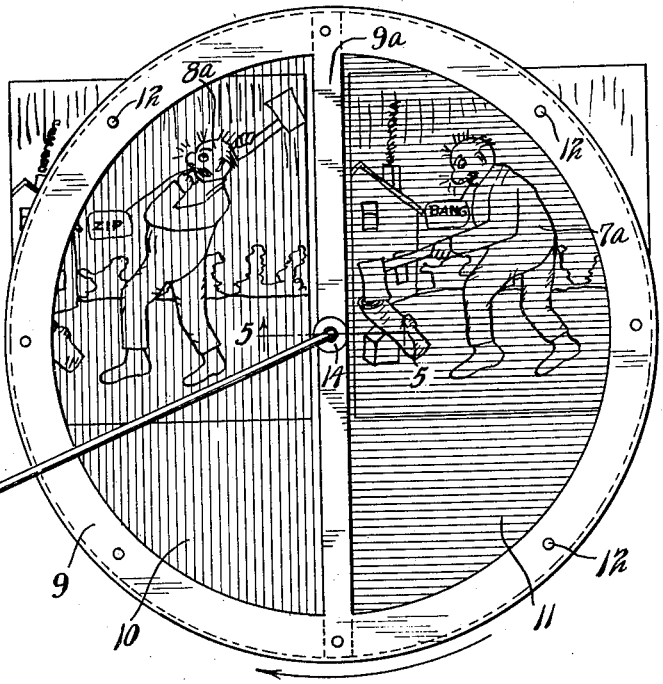
Fig. 3 is a plan view showing a revolubly mounted member having two sections, with the picture illustrated in Fig. 2 under each of said sections.
Figure 4:
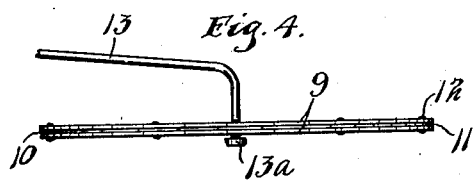
Fig. 4 is a side elevation of the transparent revoluble member.
Figure 6:
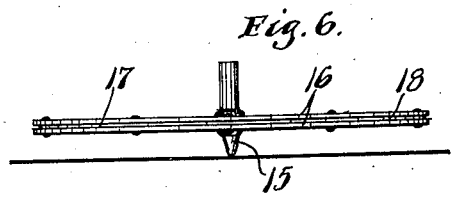
Fig. 6 is a side elevation of a modified form of the revoluble member.
Figure 5:
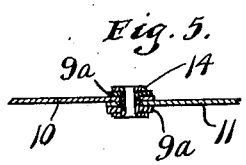
Fig. 5 is a fragmentary cross section taken on the line 5—5 of Fig. 3.

In Fig. 6 a modified form of the revoluble member is shown as a top having the axis 15, the divided annular frame member 16 similar to the members 9 in Figs. 3 and 4, and the transparent colored sections 17 and 18, respectively clamped between said frame member. In using this modified form, the newspaper or sheet, on which the picture is embodied, is laid out flat and the top is spun thereon over the picture desired to be viewed.

The operation and functions of the device are probably obvious from the drawings and the above description but may be briefly summarized as follows:

When the revoluble transparent member is held over a specially prepared picture, as illustrated, and put in motion, apparent action on the part of the man represented will take place. The red section 10 of the revolving member, when over the picture will obscure the red portion 7 on the picture and cause the blue portion 8 to be intensified, as shown by the full lines 8ª in Fig. 3, likewise, when the blue section 11 is moved over the picture, the blue portion 8 will be obscured and the red portion 7 intensified, as indicated by the numeral 7ª. In the same manner the blue word "Zip" will be brought out when the picture is under the red section 10, and the word "Bang" will be intensified when the picture is under the blue section 11. Thus, at one instant, the figure of the man in the picture is seen in one position, as in 8a, while, at the next instant, the figure of the man is seen in the downward position 7ª. The rapid alternation of these views produce the effect of apparent action, similar to the well-known motion pictures. Other optical effects, such as the disappearance of some of the objects, the change in color of others, or the partial obscurity of some figures, may obviously be produced by the use of the appropriate colors and the proper preparation of the pictures to be viewed.

From the foregoing description, it will be apparent that the apparatus, although extremely simple, and involving few parts, is highly efficient and capable of wide general application and a great variety of optical effects.

The invention has been experimented with for a considerable time and put to extensive actual usage with great success.

It will, of course, be understood that various changes may be made in the form, details, proportions, colors employed and arrangement of parts without departing from the scope of the invention.

What is claimed is:

1. Apparatus of the class described for producing apparent action from still pictures, comprising a picture having represented thereon certain figures or characters of one color and certain figures or characters of a different color, a revoluble member having a transparent section of said first mentioned color and a transparent section of said second mentioned color, means for supporting said member for revolution over said picture whereby when said member is revolved and said picture viewed therethrough said figures will be alternately obscured and intensified and will appear to move.

2. The structure set forth in claim 1, and said means comprising a handle member adjacent one end of which said revoluble member is mounted.

In testimony whereof I affix my signature.

JAMES P. McDONNELL.